United States Patent
Boone (10) Patent No.: US 11,092,007 B2
(45) Date of Patent: Aug. 17, 2021

(54) DETERMINING WELLBORE PROPERTIES WITH AN OPTIC FIBRE WHILE LOWERING A CASING

(71) Applicant: OPTASENSE HOLDINGS LIMITED, Farnborough (GB)

(72) Inventor: Kevin Boone, Farnborough (GB)

(73) Assignee: OPTASENSE HOLDINGS LIMITED, Hampshire (GB)

( * ) Notice: Subject to any disclaimer, the term of this patent is extended or adjusted under 35 U.S.C. 154(b) by 574 days.

(21) Appl. No.: 16/063,970

(22) PCT Filed: Dec. 19, 2016

(86) PCT No.: PCT/GB2016/053984
§ 371 (c)(1),
(2) Date: Jun. 19, 2018

(87) PCT Pub. No.: WO2017/109467
PCT Pub. Date: Jun. 29, 2017

(65) Prior Publication Data
US 2020/0263537 A1    Aug. 20, 2020

(30) Foreign Application Priority Data

Dec. 23, 2015 (GB) ..................................... 1522713

(51) Int. Cl.
*E21B 49/00* (2006.01)
*G01V 1/22* (2006.01)

(52) U.S. Cl.
CPC .............. *E21B 49/00* (2013.01); *G01V 1/226* (2013.01)

(58) Field of Classification Search
CPC ........ E21B 43/10; E21B 47/135; E21B 49/00; G01V 1/226
See application file for complete search history.

(56) References Cited

U.S. PATENT DOCUMENTS 5,828,003 A * 10/1998 Thomeer ............... E21B 47/053
174/69
6,009,216 A * 12/1999 Pruett .................. G01V 11/002
385/12

(Continued)

FOREIGN PATENT DOCUMENTS

FR    2697283    4/1994
GB    2 442745   4/2008

(Continued)

*Primary Examiner* — John Fitzgerald
(74) *Attorney, Agent, or Firm* — McDonnell Boehnen Hulbert & Berghoff LLP (57) ABSTRACT

This application relates to method and apparatus for determining properties of a wellbore (201). The method involves attaching part of a sensing optical fibre (101) of a fibre optic cable (203) to a well casing (202) and inserting the well casing into the wellbore (201). The sensing fibre optic is connected to an interrogator unit (102) and distributed fibre optic sensing is performed on the sensing optical fibre as the well casing is being inserted into the wellbore to provide a measurement signal from each of a plurality of sensing portions of said sensing optical fibre. The measurement signal is indicative of disturbances affecting the sensing portions. A processor (107) analyses the measurement signals from sensing portions of the sensing optical fibre that has been inserted into the wellbore to determine wellbore properties.

18 Claims, 3 Drawing Sheets

(56) References Cited

U.S. PATENT DOCUMENTS

| | | | |
|---|---|---|---|
| 7,409,858 B2* | 8/2008 | Dria | E21B 47/07 73/152.33 |
| 8,532,942 B2* | 9/2013 | Pearce | G01B 21/32 702/42 |
| 8,800,653 B2* | 8/2014 | Dria | E21B 47/07 166/253.1 |
| 8,973,434 B2* | 3/2015 | Albrecht | E21B 47/01 73/152.57 |
| 9,470,083 B2* | 10/2016 | Jaaskelainen | E21B 43/2401 |
| 9,574,434 B2* | 2/2017 | Albrecht | E21B 47/01 |
| 9,752,425 B2* | 9/2017 | Jaaskelainen | E21B 43/10 |
| 10,495,779 B2* | 12/2019 | LeBlanc | G01V 8/16 |
| 10,815,739 B2* | 10/2020 | Lovell | E21B 34/066 |
| 2004/0206511 A1 | 10/2004 | Tilton et al. | |
| 2004/0262013 A1* | 12/2004 | Tilton | E21B 17/025 166/380 |
| 2005/0034873 A1* | 2/2005 | Coon | E21B 47/135 166/380 |
| 2005/0263281 A1* | 12/2005 | Lovell | E21B 17/206 166/255.1 |
| 2008/0142212 A1* | 6/2008 | Hartog | E21B 17/025 166/250.01 |
| 2011/0290477 A1* | 12/2011 | Jaaskelainen | E21B 47/135 166/250.01 |
| 2013/0308894 A1* | 11/2013 | Head | E21B 47/017 385/12 |
| 2014/0069173 A1 | 3/2014 | Roy et al. | |
| 2014/0083177 A1* | 3/2014 | Utter | G01V 11/002 73/152.43 |
| 2015/0114127 A1 | 4/2015 | Barfoot et al. | |
| 2015/0308259 A1* | 10/2015 | Jaaskelainen | E21B 47/01 166/250.01 |
| 2017/0002645 A1* | 1/2017 | Jaaskelainen | E21B 47/007 |
| 2019/0024485 A1* | 1/2019 | Stromme | E21B 33/14 |
| 2019/0294022 A1* | 9/2019 | Alerigi | G01L 1/243 |
| 2019/0294023 A1* | 9/2019 | Alerigi | G02F 1/125 |
| 2019/0353859 A1* | 11/2019 | Hveding | G02B 6/4404 |
| 2020/0003051 A1* | 1/2020 | Ludwig | E21B 23/14 |
| 2020/0285009 A1* | 9/2020 | Hveding | G02B 6/4409 |

FOREIGN PATENT DOCUMENTS

| | | |
|---|---|---|
| GB | 2522061 | 7/2015 |
| WO | WO 98/50680 | 11/1998 |
| WO | WO 2012/072981 | 6/2012 |
| WO | WO 2012/114067 | 8/2012 |
| WO | WO 2012/137021 | 10/2012 |
| WO | WO 2012/137022 | 10/2012 |
| WO | WO 2013/045882 | 4/2013 |
| WO | WO 2015/004487 | 1/2015 |

\* cited by examiner

DETERMINING WELLBORE PROPERTIES WITH AN OPTIC FIBRE WHILE LOWERING A CASING

FIELD OF THE INVENTION

This application relates to methods and apparatus for determining properties of a wellbore, for example tight spots or washout regions, and in particular to methods and apparatus for determining wellbore properties before well completion, using fibre optic distributed fibre optic sensing and in particular distributed acoustic sensing.

BACKGROUND OF THE INVENTION

Distributed acoustic sensing (DAS) is a known technique in which an optical fibre is interrogated using optical radiation, typically coherent radiation, and radiation which is backscattered from within the fibre is detected and analysed to determine information about any disturbances acting on the fibre, such as resulting from incident acoustic stimuli, mechanical vibrations etc. By analysing the received backscattered radiation in separate time bins, based on the time after launch of the interrogating radiation, the fibre can be divided into a plurality of discrete longitudinal sensing portions where the disturbances acting on each sensing portion can be separately identified. DAS therefore can effectively divide a single optic fibre into a plurality of discrete sensing portions. DAS is typically based on Rayleigh scattering from intrinsic scattering sites inherent in the optic fibre and thus does not rely on deliberately introduced reflection sites such as formed by fibre Bragg gratings or the like. The sensing function is thus distributed through the full length of the fibre, which may be a standard unmodified optical fibre, and the size and location of the individual sensing portions can be varied by varying the properties of the interrogating radiation, which typically comprises one or more distinct pulses, and/or the time bins used in processing the detected backscatter.

DAS has been used in a number of applications such as perimeter security and monitoring of linear assets such as pipelines. DAS has also been applied to provide downhole monitoring of wellbores, such as production wells in the oil and gas industry and/or injections wells, e.g. for carbon dioxide sequestration.

DAS provides a number of advantages for downwell use. A single interrogator unit can be provided to launch optical radiation into a proximal end of the optical fibre, i.e. the end of the fibre that emerges from the well head, to interrogate the optical fibre. This avoids the need to supply power to downwell sensors. The interrogation is optical and thus safe for downwell use. If an optical fibre is provided along the whole length of the well, then the whole well can be monitored effectively simultaneously. Optical fibre is also relatively inexpensive and thus can be deployed permanently in a well setting.

In typical well formation a wellbore is drilled and then a casing is installed down the wellbore, with sections of casing being joined, e.g. screwed, together as they are inserted. Once an outer casing is in place cement is typically provided between the outer casing and the edge of the wellbore, for at least a significant part of the well. The cement secures the casing in place and also seals the area of the wellbore outside of the casing thus preventing any flow path along the well path other than through the casing.

Once the casing is securely cemented in place the well may be perforated in a number of locations to provide a flow path to/from the reservoir. For some types of production well fracturing may be performed to improve flow paths from the reservoir to the well. Various production components, production tubing, sand-screens, pumps, packers etc. may then be located within the outer casing.

Where an optical fibre for DAS is to be permanently installed in a well it may typically be attached to the outside of the casing as the casing is inserted into the well. Thus the fibre, in a suitable protective cover or cable structure, is attached to the sections of casing at the well head as they are inserted into the wellbore. This means that the fibre typically has good coupling to the casing and the presence of the fibre does not interfere with any subsequent stages of well completion (although during the perforation stage care is taken to fire the perforation charges in a direction that is not likely to damage the optical fibre). In some instances this also means that for a section of the well that has been cemented the corresponding section of optical fibre may be cemented in place, which can provide good acoustic coupling of the optical fibre to the surrounding earth formation.

DAS sensors deployed in such a downwell setting have been proposed for use for a variety of different monitoring applications, in particular for monitoring operation of the completed well, e.g. to determine flow conditions and/or identify any anomalies in use. It has also been proposed that such a downwell DAS sensor could also be used in conducting seismic surveys, in particular for various forms of vertical seismic profiling (VSP). In some instances it has also been proposed to use DAS on the fibre, once installed into the wellbore and cemented in place, to monitor some completion processes such as perforation of the well and/or hydraulic fracturing.

SUMMARY OF THE INVENTION

In embodiments of the present invention distributed fibre optic sensing is performed on the optical fibre as it is being inserted into the wellbore. Thus in an aspect of the invention there is provided a method of determining properties of a wellbore comprising:
 attaching part of a sensing optical fibre to a well casing and inserting the well casing into the wellbore;
 performing distributed fibre optic sensing on the sensing optical fibre as the well casing is being inserted into the wellbore to provide a measurement signal from each of a plurality of sensing portions of said sensing optical fibre, the measurement signal being indicative of disturbances affecting said sensing portion; and
 analysing the measurement signals from sensing portions of the sensing optical fibre that has been inserted into the wellbore to determine wellbore properties.

Embodiments of the invention thus perform DAS on a sensing fibre which is attached to the well casing as the well casing is introduced to the wellbore. The measurement signals indicative of disturbances acting on the sensing portions of that part of the fibre which has been introduced into the wellbore are analysed to determine wellbore properties, such as tight-spots or voids, for example by detecting any significant change in the disturbances as will be described in more detail below.

In some embodiments analysing the measurement signals from the sensing portions may comprise identifying measurement signals from different sensing portions at different times that correspond to the same distance into the wellbore based on the rate of insertion of the well casing into the wellbore. As will be explained in more detail later as the well casing, and thus the sensing fibre, is inserted into the wellbore the various sensing portions of the fibre will progress down the wellbore. If a feature at a certain distance into the well causes a particular acoustic/strain effect this will be detected by each sensing portion in turn. Such an identifiable feature that thus scans along the sensing portions of the sensing fibre as the casing as the well casing is inserted is thus indicative of a particular wellbore feature.

In some embodiments the method may involve forming, for each of a plurality of different distances into the wellbore, a time series of said measurement signals from different sensing portions at different times that correspond to that distance into the wellbore. In some embodiments a wellbore profile may be formed based on a function of such time series of measurement signals at each of said distances into the wellbore.

For instance the function may be an average or total intensity of the measurement signals of said time series. In this way the general amount of noise of disturbance generated at a particular point in the wellbore can be determined from the measurement signals of a number of different sensing portions. Any areas of the wellbore that provide a significantly different response can thus be identified and based on the type of response the type of feature may be determined.

In some embodiment analysing the measurement signals from the sensing portions may comprise determining any significant variation in measurement signal that tracks across several sensing portions at a rate that correlates with the rate of insertion of the well casing into the wellbore.

The method may also involve determining the distance into the wellbore of a wellbore feature giving rise to a significant variation in measurement signal by determining the distance into the wellbore which a particular sensing portion of sensing fibre has been inserted at the time at which the significant variation in measurement signal is experienced. The method may additionally or alternatively involve determining the extent of the wellbore feature by determining the number of contiguous sensing portions of sensing fibre that experience the significant variation simultaneously.

The method may comprise identifying a significant variation in measurement signal which is an increase in measurement signal. In some instances such an increase in measurement signal may be indicative of a tight spot. A significant increase may be an increase above a threshold which may be predetermined or set based on the average intensity of measurement signals from various different distances into the wellbore. The method may involve identifying a significant variation in measurement signal which is a decrease in measurement signal. In some instance such a decrease in measurement signal may be indicative of a void.

In some embodiments the rate of insertion of well casing into the wellbore may be known, but if not the method may further comprise measuring the rate of insertion of the well casing into the wellbore. As used herein the rate of insertion is not meant to mean a constant rate and the rate may be variable and include periods of stoppage. The measure of the rate of insertion of the well casing is basically a measure of how the amount of well casing inserted varies over time.

The sensing optical fibre may be typically be contained within a fibre optical cable. The fibre optic cable may be deployed from a cable drum in order to be attached to the well casing.

A first end of the fibre optic cable is attached to the well casing and the sensing optical fibre protruding from a second end of the fibre optic cable is coupled to a DAS interrogator.

In some embodiments the sensing optical fibre protruding from a second end of the fibre optic cable is coupled to a DAS interrogator via an optical collector that maintains optical connectivity whilst allowing the sensing optical fibre to rotate.

Aspects of the invention also relate to the processing of data collected during well casing insertion in order to determine well properties. Thus in another aspect there is provided a method of determining properties of a wellbore comprising:
- taking a first data set of measurement signals;
- wherein the first data set is data obtained by performing distributed fibre optic sensing on a sensing optical fibre attached to a well casing as the well casing is inserted into the wellbore; and
- wherein the measurement signals are from each of a plurality of sensing portions of said sensing optical fibre and are indicative of disturbances affecting said sensing portion; the method comprising:
- analysing the measurement signals from sensing portions of the sensing optical fibre that has been inserted into the wellbore to determine wellbore properties.

Aspects also relate to an apparatus. Thus in another aspect there is provided an apparatus for determining properties of a wellbore comprising:
- an interrogator unit for performing distributed fibre optic sensing on a sensing optical fibre attached to a well casing as the well casing is inserted into the wellbore to provide a measurement signal from each of a plurality of sensing portions of said sensing optical fibre, the measurement signal being indicative of disturbances affecting said sensing portion; and
- a processor for analysing the measurement signals from sensing portions of the sensing optical fibre that has been inserted into the wellbore to determine wellbore properties.

The apparatus may be configured to operate in any of the variants of the method described above or later.

In particular the apparatus may comprise an optical collector for coupling the interrogator unit to the sensing optical fibre, the optical collector being configured to maintain optical connectivity whilst allowing the sensing optical fibre to rotate.

DESCRIPTION OF THE DRAWINGS

To further explain embodiments of the invention and the benefits thereof the invention will now be described by way of example only, with respect to the accompanying drawings, of which.

DESCRIPTION OF THE INVENTION

Embodiments of the present invention use fibre optic distributed acoustic sensing (DAS) to provide monitoring of a wellbore as a well casing is being run into, i.e. inserted into, the wellbore. A fibre optic cable structure comprising at least one optical fibre may be attached to the casing which is being introduced to the wellbore. The optical fibre is used as a sensing fibre for DAS and interrogated by a suitable interrogator unit as the casing is being installed in the well, i.e. during installation of the casing and the fibre optic cable. By monitoring the DAS signal as the casing is being introduced into the wellbore information about the wellbore may be determined, for instance any instances of tight-spots or of voids which could be indicative of washout regions. The well casing may be a production casing that is being run into a well to be cemented in place in at least part of the well or may generally be any part of a completion string that is run into an open hole, i.e. which is being introduced into a part of the borehole which is not lined with some other pre-existing casing.

As mentioned previously fibre optic distributed acoustic sensing (DAS) is a known technique that allows an optical fibre to be interrogated using interrogating radiation to provide an indication of any dynamic environmental disturbances acting on the fibre along its length, for example incident acoustic waves or vibrations.

Figure 1:
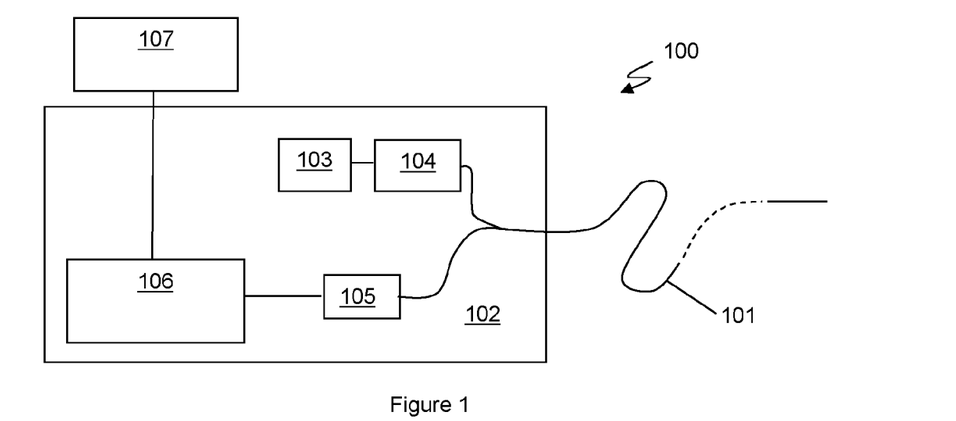
FIG. 1 illustrates a conventional DAS sensor apparatus.

FIG. 1 shows a schematic of a distributed fibre optic sensing apparatus 100. A length of optical fibre 101, which will be referred to herein as a sensing fibre, is removably connected an interrogator unit 102, either directly or through some suitable optical coupling or intermediate fibre (although generally it is preferred to keep the number of optical connections or splices to a minimum to avoid optical losses). In use the interrogator unit launches optical radiation into the sensing fibre and detects and analyses radiation which is backscattered from within the optical fibre to determine any disturbances affecting the sensing fibre.

The sensing fibre 101 can be many kilometres in length and DAS can be satisfactorily performed on sensing fibres of up to 40 km or more in length. For downwell applications the length of the sensing fibre may be tailored to the particular wellbore of interest, but typically such wellbores may be of the order of a few kilometres in length and thus sensing fibre could be provided for substantially the whole length of the wellbore—or at least the whole length of the wellbore which is provided with a production casing.

The sensing fibre may be a standard, unmodified single mode optic fibre such as is routinely used in telecommunications applications without the need for deliberately introduced reflection sites such a fibre Bragg grating or the like. Commonly single mode fibre is used. The ability to use an unmodified length of standard optical fibre to provide sensing means that low cost readily available fibre may be used. However in some embodiments the fibre may comprise a fibre which has been fabricated to be especially sensitive to incident vibrations. The fibre will be protected by containing it within a suitable cable structure which may include one or more armouring or strengthening elements running along the length of the cable.

In use the fibre 101 is deployed in an area of interest to be monitored which, in embodiments of the present invention, is within a wellbore, i.e. a borehole.

In operation of the DAS sensing apparatus 100 the interrogator 102 launches interrogating electromagnetic radiation, which may for example comprise a series of optical pulses having a selected frequency pattern, into the sensing fibre 101. The optical pulses may have a frequency pattern as described in GB patent publication GB2,442,745 or optical characteristics such as described in WO2012/137022, the content of which are hereby incorporated by reference thereto. It will be appreciated however that DAS sensors relying on other forms of optical interrogation are also known and may be used. Note that as used herein the term "optical" is not restricted to the visible spectrum and optical radiation includes infrared radiation and ultraviolet radiation. The term "light" should be construed similarly.

The interrogator conveniently comprises at least one optical source such as a laser 103 and at least one optical modulator 104 for producing the interrogating radiation, e.g. a plurality of optical pulses separated by a known optical frequency difference. The interrogator also comprises at least one photodetector 105 arranged to detect radiation which is Rayleigh backscattered from the intrinsic scattering sites within the fibre 101.

As described in GB,442,745 or WO2012/137022 the phenomenon of Rayleigh backscattering results in some fraction of the light input into the fibre being reflected back to the interrogator, where it is detected to provide an output signal which is representative of disturbances acting on the fibre. As the interrogating radiation is coherent the Rayleigh backscatter received back at the interrogator at any instant is an interference signal of the backscatter generated within the fibre from a particular position in the fibre. It will be noted this Rayleigh backscatter is generated by interaction between the interrogating radiation and inherent scatting sites present within the optical fibre. Thus the sensing function is effectively distributed throughout the whole sensing fibre (although the returns are processed in time bins to provide results from individual sensing portions of the fibre). Such a sensor is therefore referred to as a distributed sensor or intrinsic sensor as the sensing is distributed throughout and intrinsic to the fibre itself. This is in contrast to sensors that used fibres having fibre Bragg gratings (FBGs) or similar deliberately introduced extrinsic reflection sites where the sensing function is provided in defined areas and which typically operate as a series of point sensors.

It should be noted that Rayleigh backscatter DAS sensor is very useful in embodiments of the present invention but systems based on Brillouin or Raman scattering are also known and could be used in embodiments of the invention.

The signal detected by photodetector 105 may be processed by signal processor 106. FIG. 1 illustrates the signal processor as part of the interrogator unit but in some embodiments the interrogator unit could be arranged to output the detected backscatter signal to an external processor. In any case the signal processor conveniently demodulates the returned signal, e.g. based on the frequency difference between the optical pulses. The interrogator may operate as described in GB2,442,745 or WO2012/137022 for example or as described in WO2012/137021. The signal processor may also apply a phase unwrap algorithm.

In general a measurement signal for each of a plurality of sensing portions of the optical fibre can be derived from the backscattered light from those sections. In some embodiments a phase value for the measurement signal is determined. Any changes in the effective optical path length within a given section of fibre, such as would be due to incident pressure waves causing strain on the fibre will lead to a change in the measured phase between repeated interrogations. Thus dynamic changes acting on the fibre can therefore be detected in each of a plurality of sensing portions of the optical fibre by detecting changes in phase.

Note that the term acoustic shall be taken to mean any type of pressure wave or varying strain generated on the optical fibre and for the avoidance of doubt the term acoustic will be used in the specification to include seismic signals and waves or other mechanical disturbances/vibrations etc.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. As mentioned such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m or so, which for a continuous length of fibre of the order of 10 km say could provide 1000 independent sensing portions or acoustic channels along the length of the optical fibre. As mentioned the spatial resolution may be determined by the interrogator unit and in some applications spatial resolutions of the sensing portions may be of the order of 1 m or so or lower and/or may be varied in use.

As the sensing optical fibre is relatively inexpensive the sensing fibre may be deployed in a location in a permanent fashion as the costs of leaving the fibre in situ are not significant.

As noted above DAS has previously been proposed for in-well monitoring. It is therefore necessary to introduce a suitable optical fibre into the relevant length of the well to be monitored to act as the sensing fibre 101. In some applications a fibre optic cable can be inserted into an existing completed well, for instance as part of, or attached to, a wire-line tool or the like. This however typically requires a well intervention in order to introduce the sensing fibre and the presence of the sensing fibre may interfere with normal well operation.

It is therefore known to permanently install one or more suitable optical fibres during well formation that can subsequently be used for DAS in a manner that does not interfere with subsequent well operation.

In many instances once a wellbore has been drilled a production casing is installed in the wellbore. The production casing is introduced in sections, with a new section of casing being joined to a previous section before being introduced into the well. In this way a production casing structure is built up that extends from the well head to the vicinity of the production zone (for a production well). Once the production casing is in place it is typical to cement the production casing in place for at least part of the length of the well in order to hold the casing in place and prevent any flow path along the wellbore other than through the casing. One skilled in the art will appreciate that in some well installations there may be additional casings outside the production casing that are installed for a section of well near to the well head, but the production casing may be cemented in pace at least from a certain well depth.

It is known to attach a suitable ruggedized fibre optic cable to the sections of casing as they are in the process of being introduced into the wellbore. The fibre optic cable is thus introduced down the well with the casing and may run into the well for at least as long as the production casing. The fibre optic cable may be attached to the inside of the casing sections but to ensure no interference with subsequent well operation it is common the attach the fibre optic cable to the outside of the casing.

Once the casing has been installed to the desired distance into the well, i.e. the deployment of the production casing is complete, an optical fibre from the cable may subsequently be connected to an interrogator unit for DAS sensing.

It has been previously proposed that DAS could be used to provide useful information about some subsequent steps involved in well completion, for instance a perforation step and/or hydraulic fracturing (if performed). However the conventional approach is that the sensing fibre is installed in the wellbore before being used for DAS.

It has been realised by the present inventors however that using the sensing fibre for DAS as the well casing is being introduced can provide useful information about the wellbore. One skilled in the art would not have considered the use of DAS using an optical fibre that is the process of being installed in a wellbore because the installation process is inherently a noisy process that will create a large amount of disturbance of the casing and the fibre optic cable. It would therefore be expected therefore that the environment would simply be too noisy to provide any useful information. Further this requires the ability to interrogate an optical fibre as it is being deployed, where the fibre is typically installed in a relatively rigid cable structure and the wellbore may be in a relatively inhospitable environment.

Figure 2:
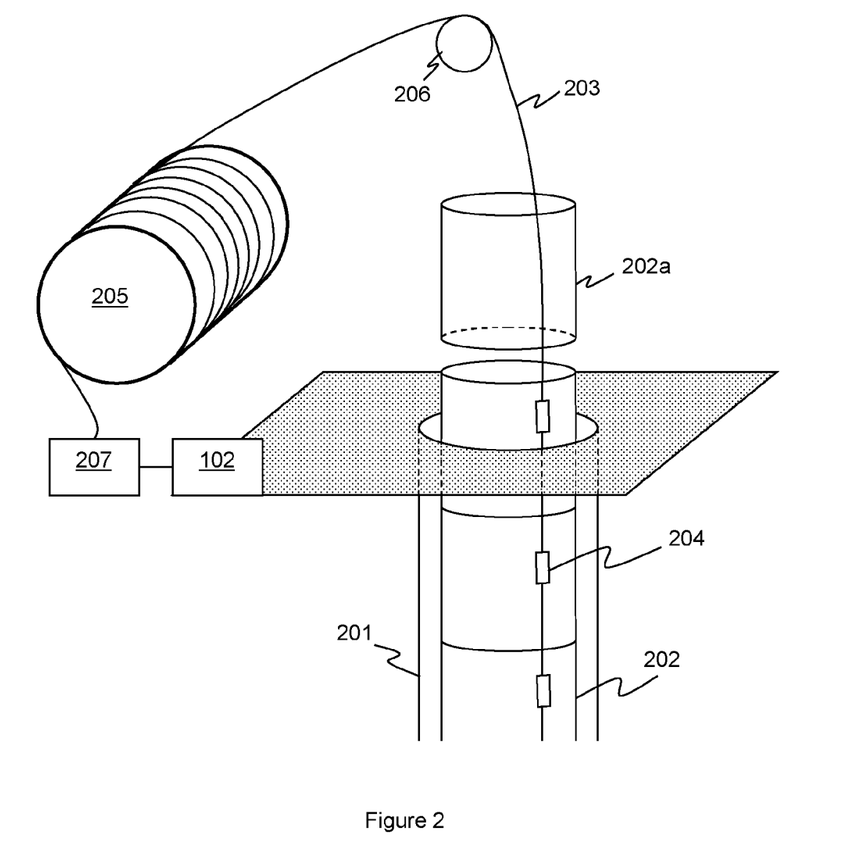
FIG. 2 illustrates an example of DAS applied on a sensing cable being installed in a wellbore.

FIG. 2 illustrates the principles of performing DAS on a sensing optical fibre that is attached to sections of casing being run in a wellbore. FIG. 2 illustrates a wellbore 201 into which a production casing 202 is being introduced. FIG. 2 illustrates that the casing is formed from a number of casing sections and illustrates a section 202a that is about to be joined to the casing structure that has already been introduced into the wellbore. A fibre optical cable 203, containing at least one optical fibre suitable for DAS, is attached to the outside of casing 202. The new section of casing 202a may be located in placed and attached, e.g. screwed, to the existing casing. The fibre optic cable 203 may be secured against the outside of the new casing section, e.g. through the use of clamps 204, although various means of attaching the fibre optic cable to the casing may be used. The casing structure with the newly added section of casing is introduced further into the well, forcing the existing casing structure with attached fibre optic cable deeper into the well, before another new section of casing is added. This process is repeated in a generally continuous manner until casing has been inserted to a required distance into the wellbore.

The fibre optic cable 203 may comprise a relatively rugged cable structure with various armouring layers and strengthening elements arranged in the cable and thus may be relatively inflexible. In use the cable may be deployed from a suitable large radius cable drum 205, possibly via one or more guide/sheave wheels 206.

The fibre optic cable drum 205 may be arranged such that a first end of the fibre optic cable 203 can be deployed from the drum and attached to a section of casing 202 for deployment into the wellbore with further fibre optic cable being played out from the cable drum as required. In addition a certain length of the fibre optic cable at the second, opposite end of the fibre optic cable 203 is accessible.

In embodiments of the present invention an optical fibre that emerges from the second end of the fibre optical cable, i.e. the end at the well head, is connected to a DAS interrogator 102. In some embodiments the fibre optic from the second end of the fibre optic cable 203 may be connected to an optical collector 207 that maintains optical connectivity between the interrogator unit and the sensing fibre in use, as the cable drum will turn in use as the fibre optic cable 203 is deployed. For example the optical collector may a fibre optic rotary joint that maintains optical connectivity whilst allowing the optical fibre to rotate as the cable drum rotates to avoid undue twisting of the portion of the optical fibre/fibre optic cable that extends from the cable drum to the interrogator unit. Various types of fibre optic rotary coupling or slip ring are known and may be used as the optical collector 207.

In use the cable drum may be located near the wellbore in question and the first end of the fibre optic cable may be arranged as required with respect to a deployment rig (not shown in FIG. 2 for clarity). An optical fibre from the second end of the fibre optic cable 203 may then be connected to the optical collector 207 and thus optically connected to the interrogator unit 102. The interrogator unit may be powered and a check may be performed that DAS can be performed on the optical fibre and that a suitable measurement signal is being received from the optical fibre.

Ideally a single continuous length of fibre optic cable should be used for the whole length of the casing run which is to be provided with optical fibre to avoid optical losses associated with splices etc. The cable drum 205 should thus contain a sufficient length of fibre optic cable 203 for the cable to run down to the desired distance into the well and also from the well head to a desired location where a DAS interrogator will be located following well completion. In some instances however the cable drum may hold significantly more optical fibre than is required for the particular wellbore, for example a cable drum could hold say 20 km of fibre where the particular wellbore may only be of the order of a few kilometres in length. As mentioned above DAS can be performed on optical fibres of up to 40 km or more in length or so and thus it would still be possible to perform DAS using the optical fibre of the fibre optic cable 203 but only the returns from the sensing portions of channels at the first end of the fibre, i.e. the remote end from the interrogator, may be of interest.

Assuming that there are no problems with this initial check the casing 202, with attached first end of the fibre optic cable 203, may start to be introduced into the wellbore as described above. In embodiments of the invention the DAS interrogator remains connected to the second end of the fibre optic cable and interrogates the optical fibre of the fibre optic cable during the casing insertion process. By monitoring the signals from the sensing portions of the sensing optical fibre corresponding to the part of the fibre optic cable that have been inserted into the wellbore various features of the wellbore may be determined.

Figure 3:
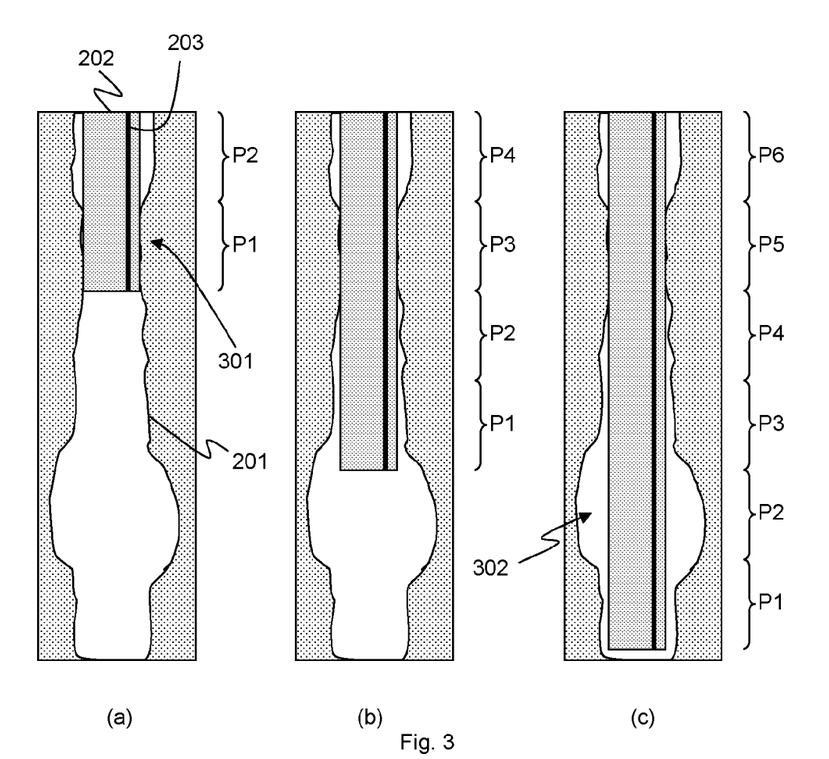
FIG. 3 illustrates examples of possible wellbore features.

One particular wellbore feature of interest may be a tight-spot, i.e. an area where the clearance between the casing and the wellbore is relatively low. FIG. 3 illustrates the casing structure 202 with fibre optic cable being inserted into a wellbore 201. FIG. 3 illustrates that at section 301 of the wellbore the clearing between the casing 202 and sides of the wellbore 201 are reduced. Identifying tight spots may be of interest for various reasons. A tight spot may represent a point of high friction for the casing being inserted into the wellbore and thus could be indicative of possible damage to the casing. This may be of interest for future well design and planning. Additionally or alternatively knowledge of the extent and/or location of any tight spots may be useful for planning the cementing stage. As mentioned after the casing is installed it is cemented in place. If the casing is relatively tight to the wellbore it may be beneficial to use a cement with a lower viscosity in order to ensure a good bond, whereas a higher viscosity may be preferable if there is generally greater clearance between the casing and the wellbore.

FIGS. 3a to 3c illustrate the casing being progressively inserted further into the wellbore. In FIG. 3a the lower part of the casing 202 is passing the tight spot 301. The first (remote) end of the fibre optic cable 203 is attached to the end of the lower part of the casing and thus this part of the fibre optic cable corresponds to the most remote sensing portion P1 of the sensing optical fibre.

As mentioned above the insertion of the casing into the wellbore will inherently be a relatively noisy process. The machinery for forcing the casing into the wellbore will create vibrations in the casing which will be transferred to the sensing fibre and vibrations will also be transmitted along the fibre optic cable itself from the handling at the well head. However especially at greater distances into the wellbore a major source of disturbances of the sensing fibre will be generated by contact between the casing and the sides of the wellbore. A certain degree of contact will be expected at any depth, however in the vicinity of a tight spot the amount of contact between the casing and the wellbore, and the intensity of the resultant disturbances of the sensing fibre will typically be greater than expected in other areas of the well bore where there is not a tight spot.

In some instance detecting an increased acoustic disturbance from a sensing portion of the sensing optical fibre as the casing is inserted into the wellbore may therefore be indicative of a tight spot. For a single sensing portion of optical fibre however there will be various sources of disturbance. If the source of disturbance is due to a fixed wellbore feature however then the same disturbance would be expected to influence each successive sensing portion as it passes the relevant wellbore feature. Thus as can be seen in FIGS. 3a to 3c as the casing is introduced further into the wellbore different sections of casing and hence different sensing portions P1 to p5 traverse the region of the tight spot. In many well completions the casing is inserted into the well at a relatively constant rate and thus the casing and attach sensing fibre traverse the region of the tight-spot at a relatively constant rate.

Figure 4:
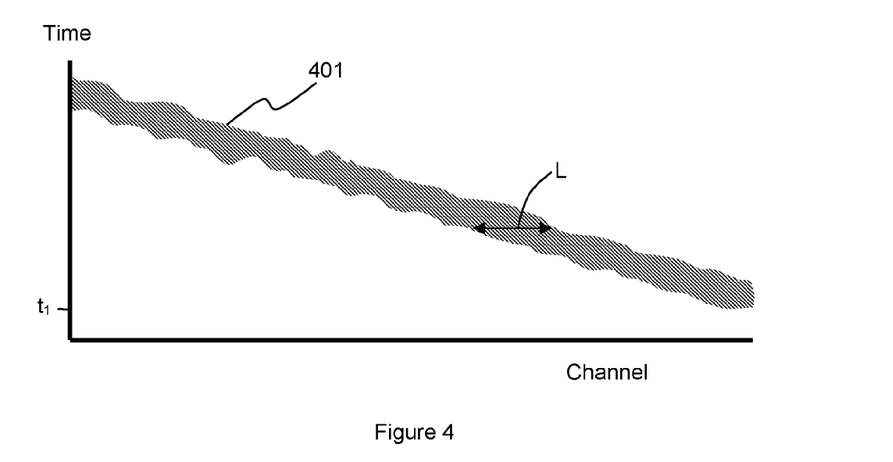
FIG. 4 illustrates an example acoustic signal characteristic of a wellbore feature.

Thus in a waterfall type plot of acoustic channel against time showing the intensity of any detected disturbance then a disturbance due to a wellbore feature would appear to traverse along the sensing fibre at a rate related to the rate of casing insertion. FIG. 4 shows a simplified waterfall type plot where the plot shows an indication of acoustic intensity above a certain threshold and how it evolves over time for the various channels of the sensing fibre. It can be seen from this plot that at a certain time ti a relatively intense disturbance is detected by the channel(s) at the remote end of the fibre. Over time this disturbance apparently travels along the length of the sensing fibre at (in this example) a relatively constant rate. The rate of insertion of the casing, and hence fibre optic cable, into the wellbore is known or can be measured and correlated to the apparent rate of progression along the sensing fibre. In this way the disturbance can identified as being likely to be due to a wellbore feature and the increased disturbance indicative of a tight-spot. The distance of the wellbore over which the tight-spot extends can be determined by length L of the sensing fibre corresponding to acoustic channels experiencing increased disturbance at the same time. For instance if the sensing portions are of the order of 5 m in length say then if a disturbance affecting four contiguous channels apparently travels along the sensing fibre at a rate that corresponds to the rate of insertion of the casing then it may be determined that a tight spot of the order of 15-20 m or so exists at that point in the wellbore. The location into the wellbore may be determine through knowledge of the amount of casing that has been inserted into the casing before the disturbance is detected by a given sensing portion at a known distance along the casing. For example the amount of casing inserted into the well at a time ti could be used to estimate the distance into the well of the feature giving rise to this disturbance.

The same principle can be used to identify any voids in the wellbore which again may be useful for planning the subject cementing stage or useful for informing future well operations. FIG. 3 illustrates there may be a void region 302. In such a region the clearance between the casing and wellbore may be greater than usual and in some instances this may reduce the amount of disturbance of the casing in this region. This may therefore be detected as an area of unusually low acoustic activity progressing along the sensing fibre in the same way as described above.

It should be appreciated however that in some instances the amount of disturbance detected may actually decrease in the vicinity of a tight spot, for example if the cable containing the fibre optic is constrained from moving as much in the vicinity of the tight spot. Conversely in an area of a void the cable may be free to undergo a greater amount of movement and thus may experience a greater disturbance in the area of a void.

In some embodiments the measurements of the optical fibre may include an indication of any DC coupled strain acting on the optical fibre. In areas of a tight spot the fibre may be stretched more due to friction against the borehole. Thus may result in a change of DC strain level that may be detected to an additional or alternative means of detecting wellbore features.

In some embodiments the measurements of the optical fibre may include low frequency disturbances. Low frequency effects may also result from temperature variations affecting the optical fibre. Such changes in temperature could also provide indications of variations in borehole features. For instance if the borehole is in a thermal gradient, the temperature change induced at the (incoming) casing and fibre may be related to the amount of fluid surrounding it and hence related to borehole diameter.

Figure 5:
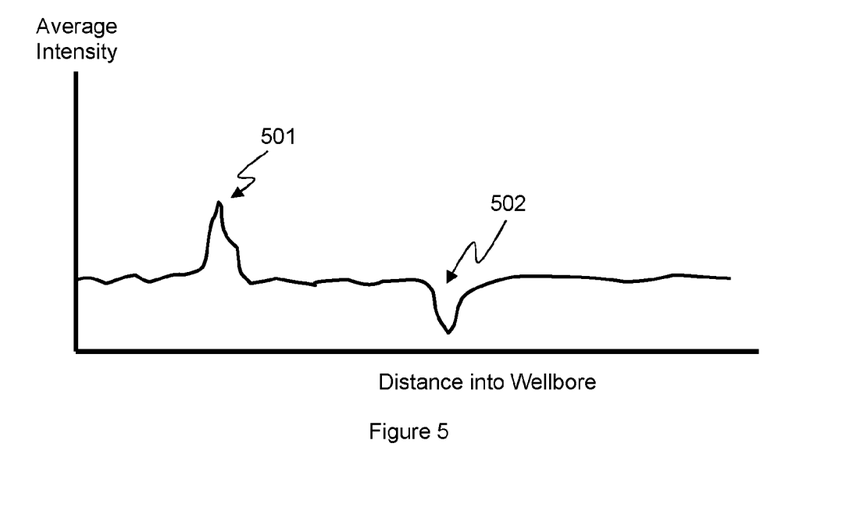
FIG. 5 illustrates one example of how the acoustic data collected may be analysed to determine wellbore features.

In some embodiments another way of processing the data may be to produce a time series of the acoustic returns corresponding to a particular distance into the wellbore based on the known rate of insertion of the casing into the wellbore. For example consider a distance 1 km into the wellbore. No data from the DAS sensor may be considered until 1 km of casing has been inserted into the wellbore (allowing for any known compression of the casing). At this point data from the most remote sensing portion may be taken. The relevant contributing sensing portions of the sensing fibre may then be scanned along the sensing fibre at a rate correlated with the known rate of casing insertion—which may occur at a constant or a variable rate and may include various stoppages and possibly reversals. The resultant time series of acoustic data indicates the acoustic response of the various sensing portions of the sensing fibre as inserted past that part of the wellbore. The various time series may be compared to identify wellbore features. For instance an average intensity may be determined and the intensity compared along the wellbore. FIG. 5 illustrates a plot of average intensity against distance into the wellbore. In some instances a high point 501 may be indicative of a tight-spot and a low point 502 may be indicative of a void.

Embodiments of the invention thus provide methods and apparatus for determining the properties of a wellbore as a well casing is being inserted. This information may be useful for identifying any areas of concern in a wellbore and may allow subsequent steps of well completion, such as cementing, and/or operation to be tailored appropriately. This may, for example, be the last chance to get information on wellbore diameter before cementing.

Information about wellbore features may also be useful for optimizing drilling fluids in future nearby wells to reduce formation swelling. One may also optimize circulation time with the drill bit at bottom. In some well formation processes fluid may be pumped down the drill pipe and return along the outside of the pipe to the surface to clean out the wellbore, with pumping occurring over several hours. Information regarding how the wellbore diameter changes over time, for example after a wiper trip to when casing is run, may be determined.

Such information may also be of use for the planning and formation of future wells. Embodiments employ DAS sensing on a sensing optical fibre that is attached to the casing as it is being inserted. Such optical fibre are increasing being provided in wells for allow for fibre optic distributed sensing in well operation and thus the provision of the optical fibre need not represent any additional step. Previously it would have been thought that a useable DAS measurement could not usefully be obtained from a sensing fibre during casing insertion due to the inherent noise in such a process.

It should be noted that the above-mentioned embodiments illustrate rather than limit the invention, and that those skilled in the art will be able to design many alternative embodiments without departing from the scope of the appended claims, The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of determining properties of a wellbore comprising:
    attaching part of a sensing optical fibre to a well casing and inserting the well casing into the wellbore;
    performing distributed fibre optic sensing on the sensing optical fibre as the well casing is being inserted into the wellbore to provide a measurement signal from each of a plurality of sensing portions of said sensing optical fibre, the measurement signal being indicative of disturbances affecting said sensing portion; and
    analysing the measurement signals from sensing portions of the sensing optical fibre that has been inserted into the wellbore to determine wellbore properties, wherein analysing the measurement signals from said sensing portions comprises identifying measurement signals from different sensing portions at different times that correspond to the same distance into the wellbore based on the rate of insertion of the well casing into the wellbore.

2. A method as claimed in claim 1 further comprising measuring the rate of insertion of the well casing into the wellbore.

3. A method as claimed in claim 1 wherein the sensing optical fibre is contained within a fibre optical cable and the fibre optic cable is deployed from a cable drum to be attached to the well casing.

4. A method as claimed in claim 3 wherein a first end of the fibre optic cable is attached to the well casing and the sensing optical fibre protruding from a second end of the fibre optic cable is coupled to a DAS interrogator.

5. A method as claimed in claim 3 wherein the sensing optical fibre protruding from a second end of the fibre optic cable is coupled to a DAS interrogator via an optical collector that maintains optical connectivity whilst allowing the sensing optical fibre to rotate.

6. A method as claimed in claim 1 comprising forming, for each of a plurality of different distances into the wellbore, a time series of said measurement signals from different sensing portions at different times that correspond to that distance into the wellbore.

7. A method as claimed in claim 6 comprising forming a wellbore profile based on a function of said time series of said measurement signals at each of said distances into the wellbore.

8. A method as claimed in claim 7 wherein said function is an average or total intensity of the measurement signals of said time series.

9. A method as claimed in claim 1 wherein analysing the measurement signals from said sensing portion comprises determining any variation in measurement signal that tracks across several sensing portions at a rate that correlates with the rate of insertion of the well casing into the wellbore.

10. A method as claimed in claim 9 comprising determining the distance into the wellbore of a wellbore feature giving rise to said variation in measurement signal by determining the distance into the wellbore which a particular sensing portion of sensing fibre has been inserted at the time at which the variation in measurement signal is experienced.

11. A method as claimed in claim 9 comprising determining the extent of the wellbore feature by determining the number of contiguous sensing portions of sensing fibre that experience the variation simultaneously.

12. A method as claimed in claim 9 comprising identifying a variation in measurement signal which is a decrease in measurement signal.

13. A method as claimed in claim 12 comprising identifying said decrease in measurement signal as indicative of a void.

14. A method as claimed in claim 9 comprising identifying a variation in measurement signal which is an increase in measurement signal.

15. A method as claimed in claim 14 comprising identifying said increase in measurement signal as indicative of a tight spot.

16. A method of determining properties of a wellbore comprising:
taking a first data set of measurement signals,
wherein the first data set is data obtained by performing distributed fibre optic sensing on a sensing optical fibre attached to a well casing as the well casing is inserted into the wellbore; and
wherein the measurement signals are from each of a plurality of sensing portions of said sensing optical fibre and are indicative of disturbances affecting said sensing portion; the method comprising:
analysing the measurement signals from sensing portions of the sensing optical fibre that has been inserted into the wellbore to determine wellbore properties, wherein analysing the measurement signals from said sensing portions comprises identifying measurement signals from different sensing portions at different times that correspond to the same distance into the wellbore based on the rate of insertion of the well casing into the wellbore.

17. An apparatus for determining properties of a wellbore comprising:
an interrogator unit for performing distributed fibre optic sensing on a sensing optical fibre attached to a well casing as the well casing is inserted into the wellbore to provide a measurement signal from each of a plurality of sensing portions of said sensing optical fibre, the measurement signal being indicative of disturbances affecting said sensing portion; and
a processor for analysing the measurement signals from sensing portions of the sensing optical fibre that has been inserted into the wellbore to determine wellbore properties, wherein analysing the measurement signals from said sensing portions comprises identifying measurement signals from different sensing portions at different times that correspond to the same distance into the wellbore based on the rate of insertion of the well casing into the wellbore.

18. An apparatus as claimed in claim 17 comprising an optical collector for coupling the interrogator unit to the sensing optical fibre, the optical collector being configured to maintain optical connectivity whilst allowing the sensing optical fibre to rotate.

* * * * *